US006759982B2

(12) United States Patent
Akazawa et al.

(10) Patent No.: US 6,759,982 B2
(45) Date of Patent: Jul. 6, 2004

(54) RADIO DIRECTION AND POSITION FINDING APPARATUS

(75) Inventors: Hayato Akazawa, Yokohama (JP); Eiji Kobayashi, Sagamihara (JP); Tsugihiro Kurihara, Fujisawa (JP); Kazuaki Kimura, Yokohama (JP); Kazutaka Iwase, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/454,257

(22) Filed: Jun. 3, 2003

(65) Prior Publication Data

US 2003/0218569 A1 Nov. 27, 2003

Related U.S. Application Data

(63) Continuation of application No. PCT/JP02/08993, filed on Sep. 4, 2002.

(30) Foreign Application Priority Data

Sep. 28, 2001 (JP) ........................................ 2001-299220

(51) Int. Cl.[7] .............................................. G01S 5/02
(52) U.S. Cl. ..................................... 342/430; 342/427
(58) Field of Search ................................. 342/417, 427, 342/430, 442

(56) References Cited

U.S. PATENT DOCUMENTS

| 4,845,502 | A | * | 7/1989 | Carr et al. | 342/430 |
|---|---|---|---|---|---|
| 5,465,097 | A | * | 11/1995 | Fry | 342/442 |
| 5,526,001 | A | * | 6/1996 | Rose et al. | 342/442 |
| 6,373,435 | B2 | | 4/2002 | Kurihara et al. | |

FOREIGN PATENT DOCUMENTS

| JP | 50-24092 | 3/1975 |
|---|---|---|
| JP | 2-38886 A | 2/1990 |
| JP | 05150027 A | 6/1993 |
| JP | 6-27231 A | 2/1994 |
| JP | 8-21873 A | 1/1996 |
| JP | 2619144 | 3/1997 |
| JP | 2676936 | 7/1997 |
| JP | 9-211115 A | 8/1997 |
| JP | 2001-249173 | 9/2001 |

\* cited by examiner

*Primary Examiner*—Dao Phan
(74) *Attorney, Agent, or Firm*—Cohen, Pontani, Lieberman & Pavane (57) ABSTRACT

A detection apparatus is provided to detect the direction of arrival and the position of an emission source of radio wave with high accuracy. The apparatus comprises; a first and a second directional antenna 1 and 10 which rotates with a desired angle of elevation; a first and a second phase integral means 2 and 11 for outputting an integration of the output from an antenna; a first and second phase differential means 3 and 12 for outputting an difference of the outputs from an antenna; a first and a second frequency dividing means 4 and 13 for dividing frequency of the integral component of the output from an antenna; a first and a second differential gain control means 5 and 14 for controlling a gain of the differential component of the output from an antenna; a first and a third receiving means 6 and 15 for receiving an output of the frequency dividing means; a second and a fourth receiving means 8 and 17 for receiving an output of the differential gain control means; a first and a second subtraction means 7 and 16 for subtracting one detection signal output from the other detection signal output of each of receiving means 6 and 8 and receiving means 15 and 17; a first and a second calculation means 9 and 18 for determining a direction of arrival of radio wave based on an output from the subtraction means; and a position determining calculation means 19 for determining the position of the emission source of the radio wave based on an output from the calculation means.

6 Claims, 8 Drawing Sheets

(a) ANTENNA OUTPUT A (b) ANTENNA OUTPUT B (c) A + B (d) A × B

RADIO DIRECTION AND POSITION FINDING APPARATUS

This application is a U.S. Continuation Application under 35 USC 371 of International Application PCT/JP02/08993 filed on Sep. 4, 2002.

BACKGROUND OF THE INVENTION

1. Field of the Invention

The present invention relates to a direction and position finding apparatus which receives radio wave and determines the direction of arrival and the position of the emission source thereof with high accuracy.

2. Description of the Prior Art

One of the well-known prior basic direction finding apparatuses to detect the direction of arrival of radio wave is, for example, Yagi antenna which detects the direction of arrival of the radio wave using a directional antenna. Another direction finding apparatus is disclosed in the Japanese Patent Application No. H3-67789, which uses a non-directional antenna and a directional antenna to determine the direction. These conventional types of detection apparatuses provide a system to assume an azimuth angle using the directional characteristic of the antenna.

However, as conventional direction finding apparatuses are constructed as mentioned above, the accuracy of finding direction of the maximum received electric power is limited to +/−10 to 20 degrees due to a half value angle of a directional antenna (a beam spread angle at a half of the peak electric power (−3 dB)). Therefore, high accuracy detection has not been obtained.

SUMMARY OF THE INVENTION

The present invention is made to solve the problems described above, and an object thereof is to provide a direction and position finding apparatus capable of not only detecting the direction of arrival of radio wave with high accuracy, but also performing a highly accurate position finding of the emission source thereof, in other words, to provide a direction and position finding apparatus capable of performing detection of both the direction of arrival and the emission source of radio wave with a higher accuracy than used to be.

In order to accomplish the object, the radio direction and position finding apparatus in accordance with the present invention comprises; a first directional antenna which rotates with a desired angle of elevation; a first phase integral means for producing an output through an integration of output from the first directional antenna; a first phase difference means for producing an output as a difference of the outputs from the first directional antenna; a first frequency dividing means for dividing frequency of integral component of the output from the first directional antenna; a first differential gain control means for controlling gain of differential component of the output from the first directional antenna; a first receiving means for receiving output from the first frequency dividing means and producing a detection signal output; a second receiving means for receiving output from the first differential gain control means and producing a detection signal output; a first subtraction means for subtracting one detection signal output from the other detection signal output of the first and the second receiving means; a first calculation means for determining a direction of arrival of radio wave based on output from the first subtraction means; a second directional antenna which rotates with a desired angle of elevation; a second phase integral means for producing an output through an integration of output from the second directional antenna; a second phase difference means for producing an output as a difference of outputs from the second directional antenna; a second frequency dividing means for dividing frequency of integral component of the output from the second directional antenna; a second differential gain control means for controlling differential component of the output from the second directional antenna; a third receiving means for receiving output from the second frequency dividing means and producing a detection signal output; a fourth receiving means for receiving output from the second differential gain control means and producing a detection signal output; a second subtraction means for subtracting one detection signal output from the other detection signal output of the third and the fourth receiving means; a second calculation means for determining a direction of arrival of radio wave based on output from the second subtraction means; and a position determining calculation means for determining the position of the emission source of the radio wave based on outputs from the first and the second calculation means; wherein the first directional antenna and the second directional antenna rotate interlockingly.

With the arrangements described above, it is possible to detect the direction of arrival of the radio wave with a high accuracy and specify the position of the emission source of the radio wave with high accuracy.

According to the radio direction and position finding apparatus of the present invention, each of the first and the second directional antennas may use at least two vertical polarized waves.

With this arrangement, it is possible to determine the direction and the position of the emission source of the radio wave based on the integral output and the differential output of two vertical polarized directional antenna patterns. The term "antenna pattern" as used herein means received signals corresponding respectively to the horizontal plane and the vertical plane of each of the directional antennas.

According to the radio direction and position finding apparatus of the present invention, one of the first and the second directional antennas may use a vertical polarized radio wave with acute horizontal directivity, and the other of the first and the second directional antennas may use a vertical polarized radio wave with acute vertical directivity.

With this arrangement, it is possible to determine the direction of arrival and the position of the emission source of the radio wave based on the integral output and the differential output of the antenna pattern of one-column two-row vertical polarized wave directional antenna and the integral output and the differential output of the antenna pattern of two-column one-row vertical polarized wave directional antenna.

According to the radio direction and position finding apparatus of the present invention, the phase integral means may be constructed to integrate the strength of electrical field component received at the first and the second directional antennas.

With this arrangement, signals of the same frequency are integrated so that it is possible to intensify the same phase components and detect more accurately the direction of the emission source of the radio wave.

According to the radio direction and position finding apparatus of the present invention, the phase difference means may be constructed to be capable of setting the phase difference based on outputs from the first and the second directional antennas in providing the difference.

Thus, it becomes possible to detect the direction of the emission source of the radio wave based on the differential output as obtained from the outputs of the directional antennas by offsetting the phase differences.

According to the present invention, the radio direction and position finding apparatus may be provided with means for controlling the gain of the differential component of the output from each of the first and the second directional antennas to thereby determine the position of the emission source of the radio wave.

The apparatus constructed as described above can determine the direction of arrival of the radio wave by interlockingly rotating the two directional antennas to maximize the integral output and also determine the position of the emission source of the radio wave by controlling the angle of elevation while controlling the gain of the differential output.

BRIEF DESCRIPTION OF THE DRAWINGS

FIG. 6($a$) is schematic diagram illustrating configurations of the integral pattern and the differential pattern of a directional pattern in the one-column two-row vertical polarized wave directional antenna taken in the up and down direction (a vertical direction);

FIG. 6($b$) is schematic diagram illustrating configurations of the integral pattern and the differential pattern of a directional pattern in the two-column one-row vertical polarized wave directional antenna taken in the left and right direction (a horizontal direction);

FIG. 7($a$) is a schematic side elevational view illustrating an embodiment for determining the position by controlling the gain of integral and differential patterns;

FIG. 7($b$) is a schematic plan view illustrating an embodiment for determining the position by controlling the gain of integral and differential patterns.

DETAILED DESCRIPTION OF THE PREFERRED EMBODIMENTS

Preferred embodiments of the direction and position finding apparatus in accordance with the present invention will now be described in detail with reference to the accompanying drawings.

Figure 1:
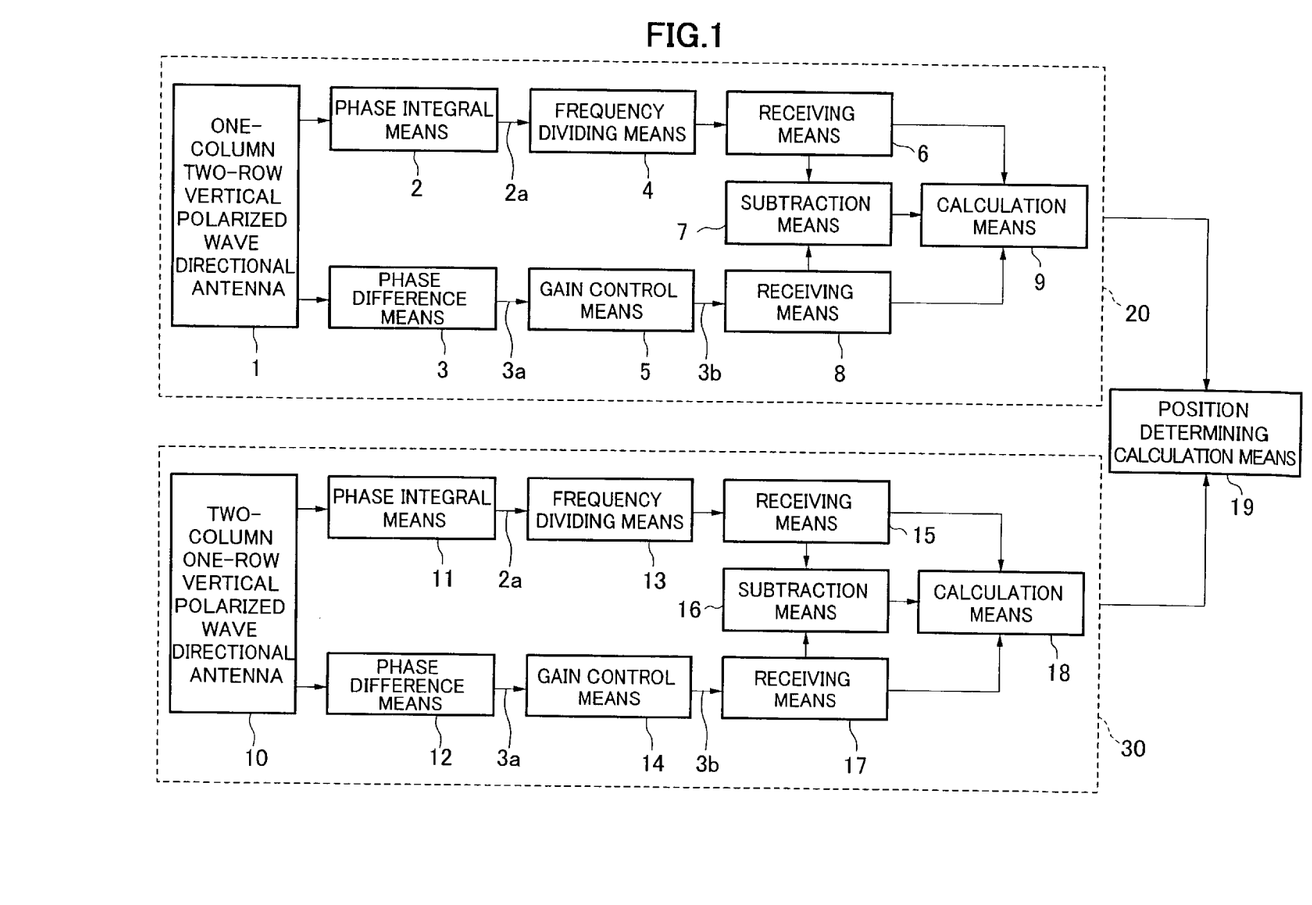
FIG. 1 is a block diagram illustrating a radio direction and position finding apparatus according to the present invention.

A block diagram of a radio direction and position finding apparatus according to the present invention is shown in FIG. 1. As shown in FIG. 1, the radio direction and position finding apparatus according to the present invention comprises a directional antenna 1 having a one-column two-row vertical polarized wave directivity and a directional antenna 10 having a two-column one-row vertical polarized wave directivity. The directional antennas 1 and 10 can interlockingly rotate respectively with predetermined angles of elevation.

Phase integral means 2 and 11 receive signals received by the directional antennas 1 and 10, respectively, and each of the means 2 and 11 multiplies the signals received by each of the antennas to generate (calculate) an integral signal based on corresponding one of these two received signals to provide an output. In a conventional antenna, such as an antenna for TV having a plurality of elements combined together, outputs from the elements have been summed together, but multiplication provides a more intensified representation than in the case of summing since components of the same phase are squared. For instance, in the case of summing, it comes X+X=2X, so that in case X=10 it comes 10+10=20. In the case of multiplication, it comes X×X=$X^2$, so that in case X=10 it comes 10×10=100. Thus, it is apparent that the outcome of multiplication becomes larger than that of summing.

Figure 8:
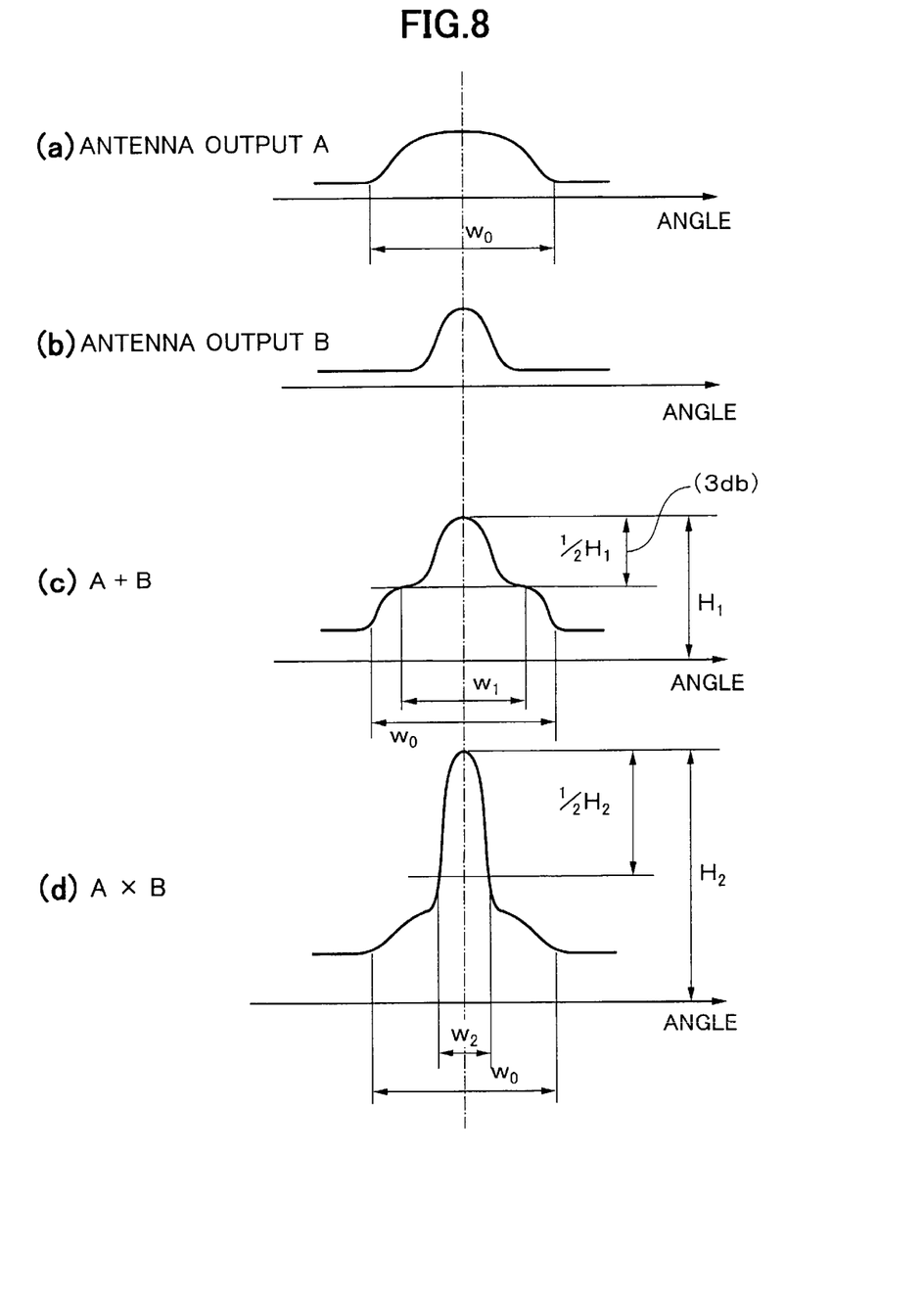
FIG. 8 is a schematic diagram for explaining the difference between the integral pattern and a sum pattern.

These relationships will now be described with reference to FIG. 8. FIG. 8($a$) shows an antenna output A and FIG. 8($b$) shows an antenna output B. Sum of antenna output A with antenna output B (A+B), and their multiplication (A×B) are as shown in FIGS. 8($c$) and ($d$) respectively. Specifically, the width of the angle $W_0$ remains the same both in the summing and the multiplication, however, it will be noted that the width of the angle $W_2$ made by the multiplication becomes far narrower than that of the angle $W_1$ made by summing and the height $H_2$ made by the multiplication becomes far larger than that of a height $H_1$ under the summing.

In other words, in the case where voltage intensity of output signals [V] is obtained through an operation by multiplication, its value becomes larger than that obtained by summing, whereas the width of angle obtained by multiplication is identical as that obtained by summing, so that the shape of the output pattern shows a sharp rise as shown in FIG. 8($d$). Thus, as the result of calculation by multiplication, the half value angle of antenna directivity (3 dB band width) shows a value narrower and sharper than that obtained by summing calculation, so that the directivity is improved to make it possible to detect the direction of arrival of the radio wave and to specify the position of the emission source of the radio wave with high accuracy.

The signal received by the directional antenna 1 and the signal received by the directional antenna 10 are respectively applied to corresponding ones of the phase difference means 3 and 12 each of which functions to generate a differential signal of each of these two received signals to provide an output from corresponding one of the means 3 and 12. In generating the differential signal, each of the phase difference means 3 and 12 can respectively set the phase difference of each of these two directional antennas 1 and 10 to a desired value.

Frequency dividing means 4 and 13 function to divide the frequencies of integral signals outputted from the respective ones of the phase integral means 2 and 9. The frequency of the output from each of the phase integral means 2 and 9 has a value which is a double of the original value as the result of multiplication, so that frequency dividing is performed to get a half value in order to return to the original frequency. For instance, it comes sin(2f)=sin(f)×sin(f). In this embodiment, the frequency of integral signal is divided into a half, but on the contrary, the frequency of differential signal may be doubled.

Gain control means 5 and 14 function to control the gain of the differential signals outputted from corresponding ones of the phase difference means 3 and 12. The gain of the differential signal will be set at a desired value.

Receiving means 6 and 15 function to detect the integral signals outputted from the frequency dividing means 4 and 13, and receiving means 8 and 17 function to detect the differential signals outputted after the gain control from the gain control means 5 and 14. Each of the subtraction means 7 and 16 calculates a difference between the detected output from the corresponding one of the receiving means 6 and 15 and that from the corresponding one of the receiving means 8 and 17. Each of the calculation means 9 and 18 determines the direction of arrival of the radio wave received by the corresponding one of the directional antennas 1 and 10 by determining the maximum value based on the output from the corresponding one of the subtraction means 7 and 16. The results are applied to the position determining calculation means 19 to determine the position of the emission source of the radios wave from the relationship between the maximum value and the angle from the central axis of each of directional antennas 1 and 10.

Operation of the embodiment of the present invention will now be described with reference to FIGS. 2 and 3.

Figure 2:
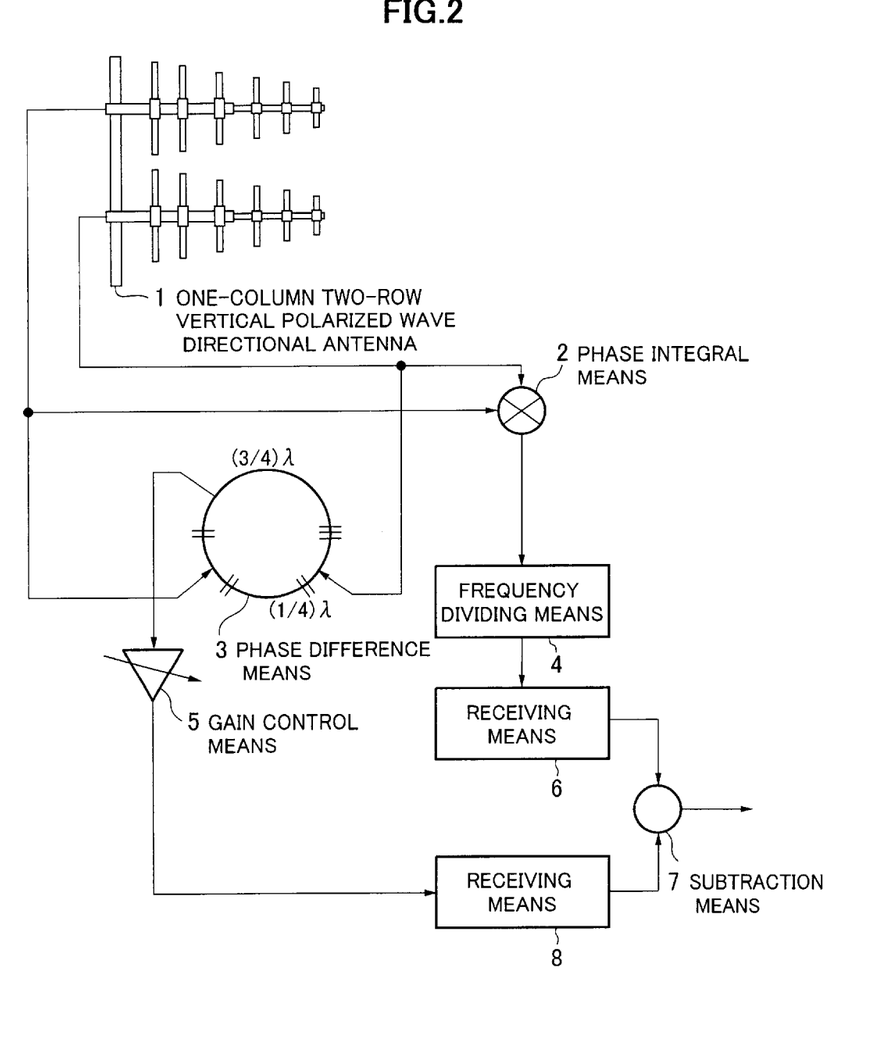
FIG. 2 is a block diagram illustrating a phase integral means and a phase differential means for calculating an integral pattern and a differential pattern of a directional pattern in a one-column two-row vertical polarized wave directional antenna, arrangements before and after these means being also illustrated.
Figure 3:
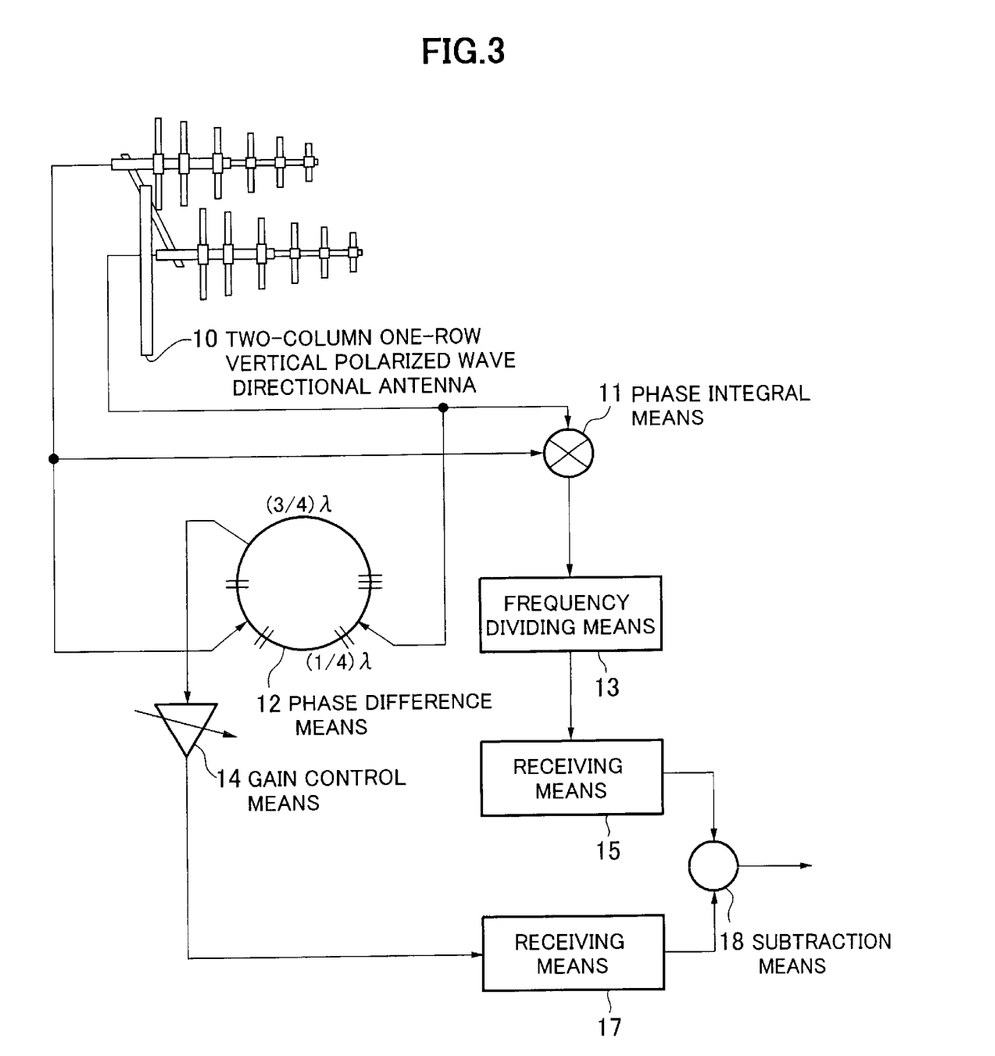
FIG. 3 is a block diagram illustrating a phase integral means and a phase differential means for calculating an integral pattern and a differential pattern of a directional pattern of a two-column one-row vertical polarized wave directional antenna, arrangements before and after these means being also illustrated.

Referring to FIGS. 2 and 3, the one-column two-row vertical polarized wave directional antenna 1 and the two-column one-row vertical polarized wave directional antenna 10 are oriented toward the same direction and have predetermined directivities, respectively. The antennas 1 and 10 are adjustable in angle of elevation and function to output received signals, respectively corresponding to horizontal and vertical planes (hereafter each being referred as an antenna pattern.)

The antenna pattern of each of the directional antennas 1 and 10 is inputted to the corresponding one of the phase integral means 2 and 11, to have the multiplication to be carried out. Through the multiplication, the in-phase components are subjected to square calculation so that the output will be greater than that obtained by summing. As the result of multiplying calculation, the half value angle of antenna directivity (3 dB band width) has a value narrower and sharper than that of summing calculation.

The integral patterns outputted from the phase integral means 2 and 11 have double value of frequency as the result of multiplication, so that it is inputted to the frequency dividing means 4 and 13 to return the double value of frequency to the original one before it is inputted to the receiving means 6 and 15. On the other hand, the antenna pattern of each of the directional antennas 1 and 10 is also inputted to each of phase difference means 3 and 12, so that the difference calculation is done accordingly.

The differential pattern outputted from each of phase difference means 3 and 12 is inputted to each of the gain control means 5 and 14 to have the gain controlled accordingly before it is inputted to each of receiving means 8 and 17.

The receiving means 6 and 8 and the receiving means 15 and 17 provide respectively the detection signals from the integration signal outputs and the differential outputs and supply these signals to the subtraction means 7 and 16. The subtraction means 7 and 16 respectively function to subtract the output values of the detection signals of the differential outputs from the output values of the detection signals of the integral signal outputs to calculate angular properties of these differences (hereafter referred as an integration-differential pattern), and respectively output the angular properties to the calculation means 9 and 18.

Figure 4:
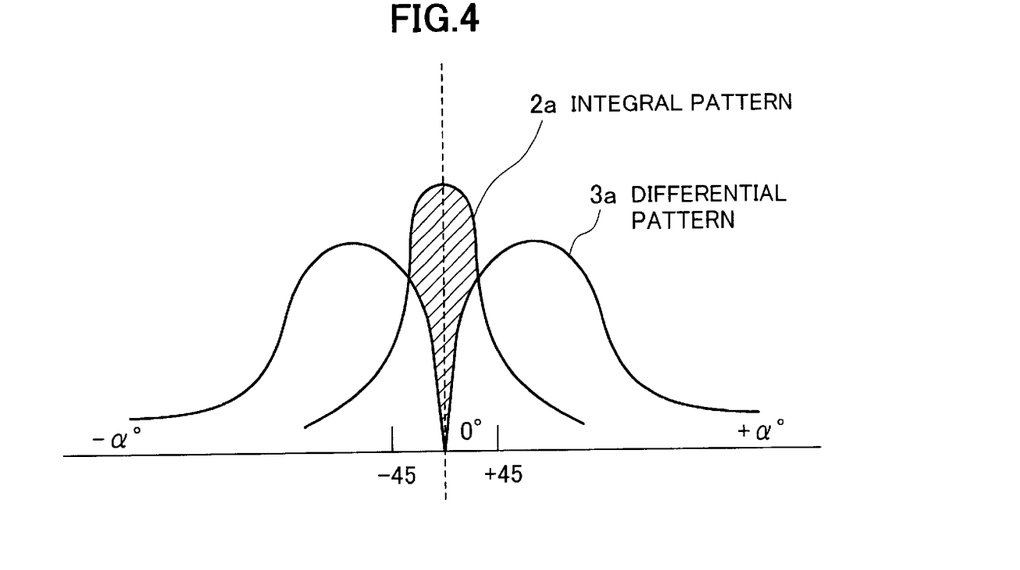
FIG. 4 is a schematic diagram illustrating an example of the integral pattern and the differential pattern.
Figure 5:
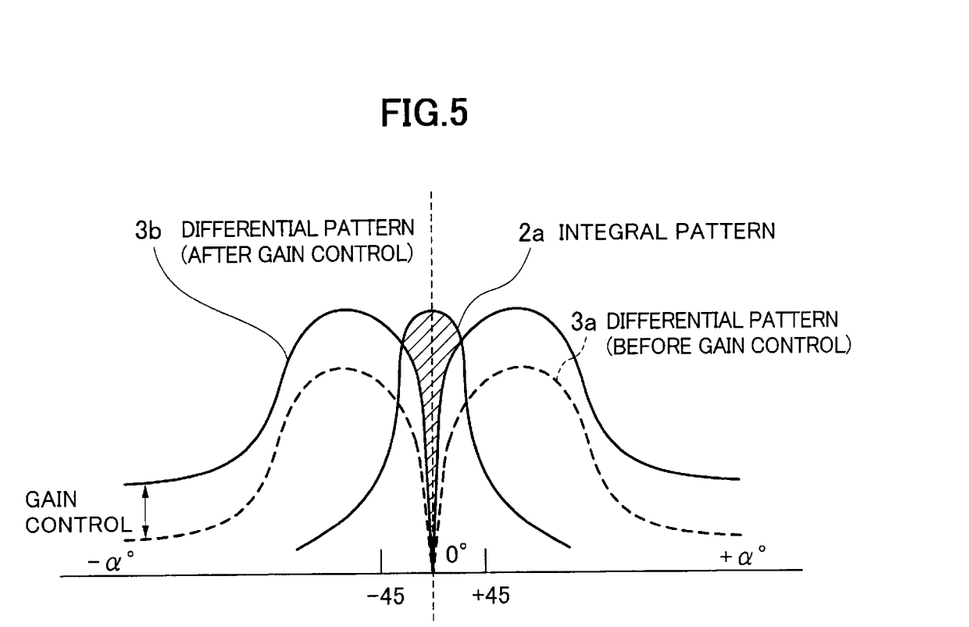
FIG. 5 is a schematic diagram illustrating a gain control of the differential pattern.

The integration pattern and the differential pattern are shown in FIGS. 4 and 5. In FIGS. 4 and 5, the reference character α designates an azimuth angle. FIGS. 4 and 5 show the case wherein the received signals of the directional antennas 1 and 10 are calculated in the integral means 2 and 11 and the difference means 3 and 12 in FIG. 1, the axis of abscissas being the angle (the azimuth angle) from the central axis of each of the directional antennas 1 and 10 whereas the vertical axis being the received signal outputs of each of the directional antennas 1 and 10.

As apparent from the integration pattern and the differential pattern shown in FIG. 4, the integration-differential pattern or the angular property shows a steep level change in the vicinity of the front side of the antenna. This indicates that the beam width (a half value angle) of the antenna is equivalently narrower in the integration-differential pattern than in the integration pattern. Further, the integration pattern outputs have steeper characteristics than the summing pattern outputs do. Accordingly, a highly accurate direction finding can be achieved. It should be noted that the differential pattern in the integration-differential pattern can be shifted by controlling the gain of the differential pattern in the gain control means. The example is shown in FIG. 5. This gain control makes it possible with high accuracy to detect the maximum point with respect to the arrival position of the radio wave.

In other words, it is possible to have the integration pattern in FIG. 5 (hatched portion) constrained to a narrow range by the gain control of the differential pattern and also to detect with high accuracy the maximum value of the length of the hatched portion parallel with the vertical axis (the length along the vertical axis of a portion of the integration pattern, the portion being obtained by deleting from the overall configuration of the integration pattern such portion that overlaps with the configuration of the differential pattern), the length showing the received level(strength).

Figure 6:
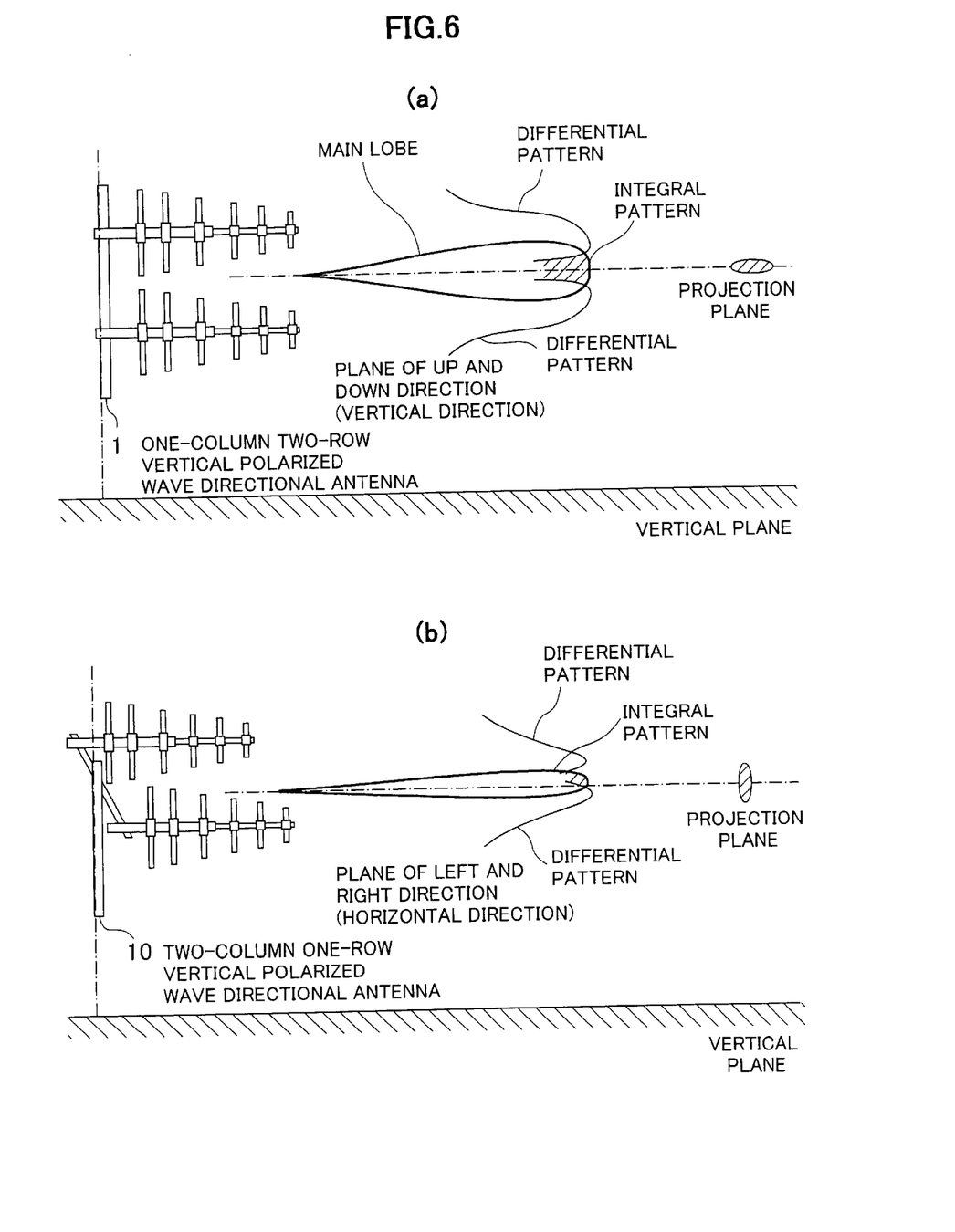

FIG. 6 shows the directivity of the one-column two-row vertical polarized wave directional antenna 1 and the directivity of the two-column one-row vertical polarized wave directional antenna 10. The directivities can be designated by the patterns in planes directed in up and down (vertical) direction and left and right (horizontal) direction. Because of the combination of the directivities, the one-column two-row vertical polarized wave directional antenna 1 shows an output having a directivity with the integration-differential pattern which is steep shaped along the up and down (vertical) direction. The two-column one-row vertical polarized wave directional antenna 10 shows an output having a directivity with integration-differential pattern which is steep shaped along the left and right (horizontal) direction. By combining these directivities, it becomes possible to detect a desired point in a space.

An example of the procedure for detecting the direction of arrival and the position of the emission source of a radio wave will now be described. The calculation means 9 and 18 function to detect the direction of arrival of the radio wave by calculating the levels of the integration patterns while the directional antennas 1 and 10 are rotated about the vertical axis of a supporting structure for supporting the directional antennas 1 and 10 to detect and determine the directions wherein the levels show the maximum values. The directions of the maximum values thus indicate the directions of arrival of the radio wave. Further, by controlling the outputs of the differential pattern using the gain control means 5 and 14 simultaneously controlling the angles of elevation of the directional antennas 1 and 10, the position can be determined.

Figure 7:
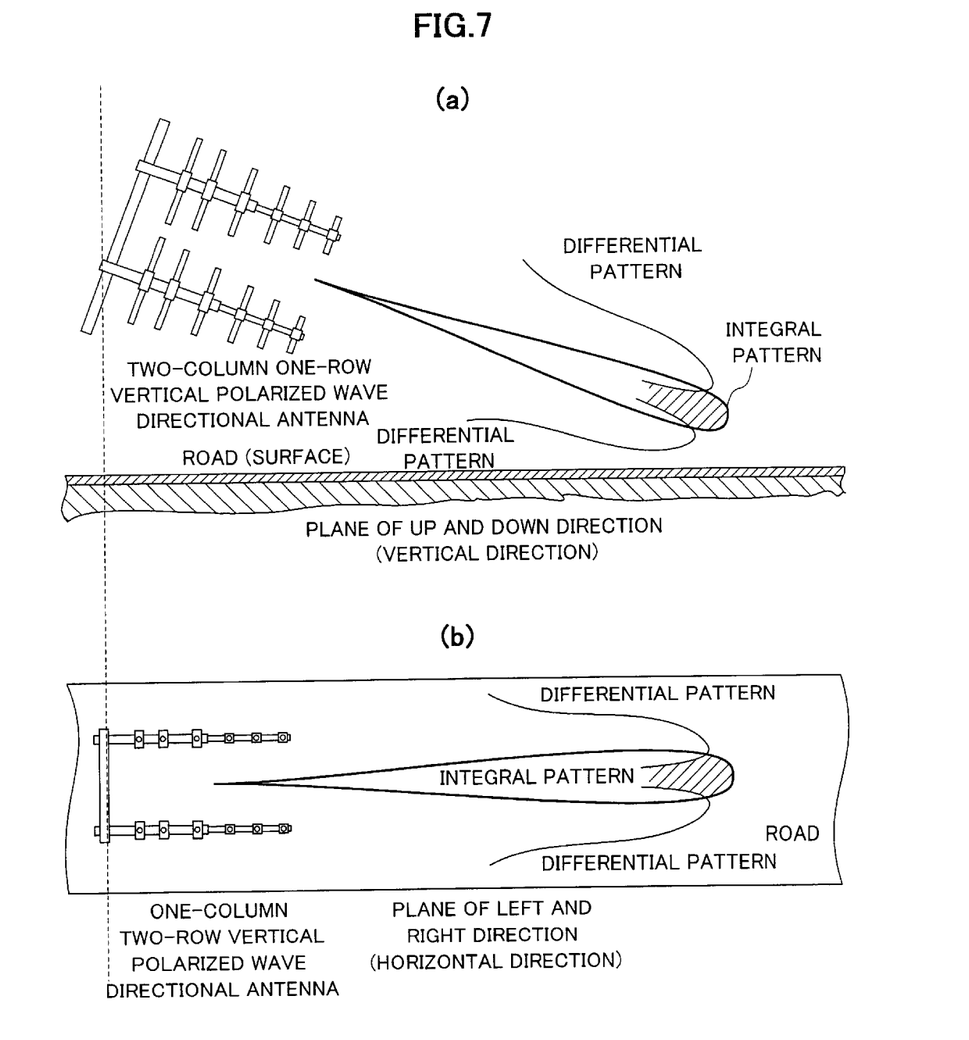

FIG. 7 shows an embodiment for measuring the direction of arrival and the position of the emission source of a radio wave along an extension of a road by the direction and position finding apparatus in accordance with the present invention. In FIG. 7, (a) is a side elevational view and (b) is a plan view. As shown in FIG. 7, when a directional antenna is placed on a traffic lane of the road to measure along the extension of the road, the directional antenna is set to have a angle of elevation to determine a measuring range on the road surface. The azimuth angle (direction) is then adjusted so that a maximum value of the integration pattern is obtained and the gain of the differential pattern is adjusted so as to make it possible to measure with high accuracy the position of the emission source of the radio wave. In the case where the range on the road (a road width) is wide, the position of the emission source of the radio wave can be measured by rotating the antenna within a horizontal plane.

As afore-mentioned, it is possible to receive a radio wave in a specific range with high accuracy without rotating and controlling the angles of elevation of the directional antennas 1 and 10, but setting the directional antennas 1 and 10 in a fixed situation. In this manner, it becomes possible to carry out a radio communication with high accuracy between ETC (Electronic toll collection) loaded equipment and road-running vehicles in an ETC system wherein transmittal and receipt of radio wave in a specific range on a road are of particular importance.

EFFECT OF THE INVENTION

As described above, the direction and position finding apparatus for radio wave according to the present invention comprises: a first directional antenna which rotates with a desired angle of elevation; a first phase integral means for producing an output through an integration of output from the first directional antenna; a first phase difference means for producing an output as a difference of the outputs from the first directional antenna; a first frequency dividing means for dividing frequency of the integral component of the output from the first directional antenna; a first differential gain control means for controlling gain of differential component of the output from the first directional antenna; a first receiving means for receiving output from the first frequency dividing means and producing a detection signal output; a second receiving means for receiving output from the first differential gain control means and producing a detection signal output; a first subtraction means for subtracting one detection signal output from the other detection signal output of the first and the second receiving means; a first calculation means for specifying a direction of arrival of radio wave based on output from the first subtraction means; a second directional antenna which rotates with a desired angle of elevation; a second phase integral means for producing an output through an integration of output from the second directional antenna; a second phase difference means for producing an output as a difference of the outputs from the second directional antenna; a second frequency dividing means for dividing frequency of the integral component of the output from the second directional antenna; a second differential gain control means for controlling the differential component of the output from the second directional antenna; a third receiving means for receiving output from the second frequency dividing means and producing a detection signal output; a fourth receiving means for receiving output from the second differential gain control means and producing a detection signal output; a second subtraction means for subtracting one detection signal output from the other detection signal output of the third and the fourth receiving means; a second calculation means for determining a direction of arrival of radio wave based on output from the second subtraction means; and a position determining calculation means for determining the position of the emission source of the radio wave based on outputs from the first and the second calculation means; wherein the first directional antenna and the second directional antenna rotate interlockingly, so that it is possible to provide a radio direction and position finding apparatus which can accomplish an advantageous effect in that it can detect the direction of arrival and specify the position of the emission source of radio wave with high accuracy.

What is claimed is:

1. A radio direction and position finding apparatus comprising;

a first directional antenna which rotates with a desired angle elevation;

a first phase integral means for producing an output through an integration of output from said directional antenna;

a first phase difference means for producing an output as a difference of the outputs from said first directional antenna;

a first frequency dividing means for dividing frequency of integral component of the output from said directional antenna;

a first differential gain control means for controlling gain of differential component of the output from said directional antenna;

a first receiving means for receiving output from said first frequency dividing means and producing a detection signal output;

a second receiving means for receiving output from said first differential gain control means and producing a detection signal output;

a first subtraction means for subtracting one detection signal output from the other detection signal output of said first and second receiving means;

a first calculation means for determining a direction of arrival of radio wave based on output from said first subtraction means;

a second directional antenna which rotates with a desired angle of elevation;

a second phase integral means for producing an output through an integration of output from said second directional antenna;

a second phase difference means for producing an output as a difference of the outputs from said second directional antenna;

a second frequency dividing means for dividing frequency of integral component of the output from said second directional antenna;

a second differential gain control means for controlling gain of differential component of the output from said second directional antenna;

a third receiving means for receiving output from said second frequency dividing means and producing a detection signal output;

a fourth receiving means for receiving output from said second differential gain control means and producing a detection signal output;

a second subtraction means for subtracting one detection signal output from the other detection signal output of said third and fourth receiving means;

a second calculation means for determining a direction of arrival of radio wave based on output from said second subtraction means; and a position determining calculation means for determining the position of the emission source of the radio wave based on outputs from said first and second calculation means;

wherein said directional antenna and said second directional antenna rotate interlockingly.

2. A radio direction and position finding apparatus in accordance with claim 1, in which each of said first and second directional antennas uses at least two vertical polarized waves.

3. A radio direction and position finding apparatus in accordance with claim 1, in which one of said first and second directional antennas is adapted to use a vertical polarized wave with an acute horizontal directivity, and the other of said first and second directional antennas is adapted to use a vertical polarized wave with an acute vertical directivity.

4. A radio direction and position finding apparatus in accordance with claim 1 in which said phase integral means is adapted to integrate strength of electrical field component of said first and second directional antennas.

5. A radio direction and position finding apparatus in accordance with claim 1 in which said phase difference means is capable of setting a phase difference based on outputs from said first and the second directional antennas in providing the differences.

6. A radio direction and position finding apparatus in accordance with claim 1 in which the position of the emission source of the radio wave can be specified by adjusting gain of the differential component of the output from said first and second directional antennas.

* * * * *